United States Patent
Jo (10) Patent No.: US 11,652,385 B2
(45) Date of Patent: May 16, 2023

(54) MOTOR

(71) Applicant: LG INNOTEK CO., LTD., Seoul (KR)

(72) Inventor: Nam U Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 319 days.

(21) Appl. No.: 17/256,103

(22) PCT Filed: Jun. 27, 2019

(86) PCT No.: PCT/KR2019/007784
§ 371 (c)(1),
(2) Date: Dec. 24, 2020

(87) PCT Pub. No.: WO2020/017778
PCT Pub. Date: Jan. 23, 2020

(65) Prior Publication Data
US 2021/0273518 A1    Sep. 2, 2021

(30) Foreign Application Priority Data
Jul. 19, 2018    (KR) .......................... 10-2018-0084003

(51) Int. Cl.
*H02K 5/10* (2006.01)
*H02K 5/173* (2006.01)
(Continued)

(52) U.S. Cl.
CPC .............. *H02K 5/10* (2013.01); *H02K 5/1732* (2013.01); *H02K 7/083* (2013.01); *B60T 13/74* (2013.01);
(Continued)

(58) Field of Classification Search
CPC ........ H02K 5/10; H02K 5/1732; H02K 7/083; B60T 13/74; B60T 2270/10; B62D 5/0403
(Continued)

(56) References Cited

U.S. PATENT DOCUMENTS

| 8,267,587 B2 | 9/2012 | Murakami et al. |
| 2016/0013697 A1* | 1/2016 | Haga .................. H02K 5/08 310/71 |

FOREIGN PATENT DOCUMENTS

| KR | 1999-0015374 U | 5/1999 |
| KR | 20-0245414 Y1 | 10/2001 |

(Continued)

*Primary Examiner* — Terrance L Kenerly
(74) *Attorney, Agent, or Firm* — Birch, Stewart, Kolasch & Birch, LLP (57) ABSTRACT

One embodiment relates to a motor comprising: a housing; a stator disposed in the housing; a rotor disposed in the stator; a shaft coupled to the rotor; a cover disposed on the housing; and an upper bearing disposed on the cover. The cover comprises: a first body having the upper bearing disposed thereon; a second body disposed on the lower side of the first body; a third body disposed on the lower side of the second body; and a protrusion part protruding in the radial direction from the outer peripheral surface of the second body, wherein the third body comprises an inclined surface inclining inwardly with respect to the outer peripheral surface of the second body. Accordingly, when a system and the motor are combined, the motor prevents an increase in the amount of interference between the housing and the cover by means of a reaction force design between the cover and each of the housing and the bearing, and thus a coupling failure in the assembly, as a result of a reaction force, occurring when the system and the motor are coupled may be prevented.

10 Claims, 11 Drawing Sheets

(51) Int. Cl.
  *H02K 7/08* (2006.01)
  *B60T 13/74* (2006.01)
  *B62D 5/04* (2006.01)

(52) U.S. Cl.
  CPC ......... *B60T 2270/10* (2013.01); *B62D 5/0403* (2013.01)

(58) Field of Classification Search
  USPC .................................................... 310/88, 90
  See application file for complete search history.

(56) References Cited

FOREIGN PATENT DOCUMENTS

| | | |
|---|---|---|
| KR | 10-0988549 B1 | 10/2010 |
| KR | 10-2015-0047025 A | 5/2015 |

\* cited by examiner

MOTOR

CROSS REFERENCE TO RELATED APPLICATIONS

This application is the National Phase of PCT International Application No. PCT/KR2019/007784, filed on Jun. 27, 2019, which claims priority under 35 U.S.C. 119(a) to Patent Application No. 10-2018-0084003, filed in the Republic of Korea on Jul. 19, 2018, all of which are hereby expressly incorporated by reference into the present application.

TECHNICAL FIELD

The present invention relates to a motor.

BACKGROUND ART

Generally, a motor includes a shaft which is rotatably disposed, a rotor coupled to the shaft, and a stator fixed inside a housing. In this case, the stator is installed to be spaced apart from the rotor by a gap along a circumference of the rotor.

In the motor, the rotation of the rotor is induced by an electrical interaction. In a case in which a coil is wound around the rotor, the motor may include a commutator and a brush to supply a current to the coil wound around the rotating rotor.

Generally, the commutator is coupled to the shaft and rotated in a state in which the commutator is connected to the coil, and the brush is coupled to a cover and disposed to be able to come into contact with the commutator. In this case, the brush comes into contact with the commutator and supplies the current to the commutator. The cover is disposed on the housing.

Conventionally, although the motor is coupled to a system (object) in a bolting manner, the coupling in the bolting manner has a problem of increasing a weight. In this case, the system may be a vehicle.

Accordingly, the motor may be coupled to the system (object) in a stacking method, but in a case in which a reaction force due to the coupling of the housing and the cover is excessive, there is a problem of generating an assembly defect due to a decrease in coupling force between the motor and the object. In this case, since the stacking method is a method of changing a material of the system in a region in which the motor is coupled and fixing the motor thereto, in a case in which a reaction force of the cover against the housing is too great, the motor may be separated therefrom due to the reaction force, and in a case in which the reaction force is too small, the movement of the cover may be generated in the motor.

Figure 1:
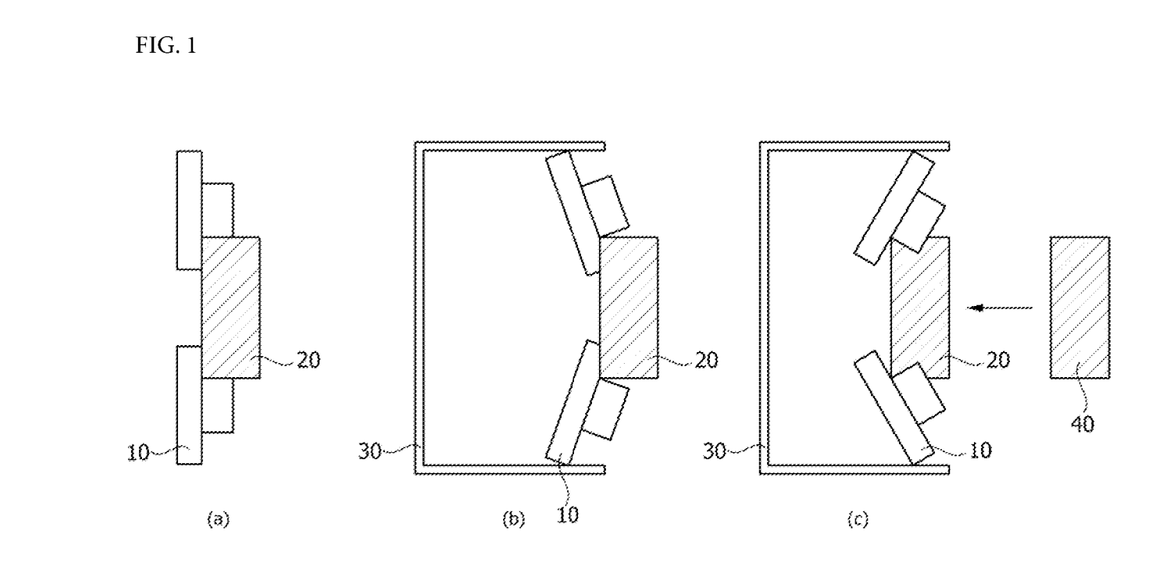
FIG. 1 is a set of conceptual views illustrating a reaction force generated when a housing and a cover are assembled.

FIG. 1 is a set of conceptual views illustrating a reaction force generated when a housing and a cover are assembled. FIG. 1A is a view illustrating the cover before the cover is assembled to the housing, FIG. 1B is a view illustrating the cover assembled to the housing, and FIG. 1C is a view illustrating the cover pressed by a system.

Referring to FIG. 1A, a bearing 20 may be disposed at one side of a cover 10.

Referring to FIG. 1B, the cover 10 on which the bearing 20 is disposed may be coupled to the housing 30. In this case, a central portion of the cover 10 may protrude toward an open side of the housing 30 due to a reaction force of the housing 30. As illustrated in FIG. 1B, the central portion of the cover 10 may be bent due to the reaction force between the cover and the housing 30. Accordingly, a pullout force due to an amount of interference between the cover 10 and the housing 30 needs to be secured.

Referring to FIG. 1C, when the motor is coupled to a system 40, the bearing 20 is pressed by the system 40 in a shaft direction. In this case, the cover 10 enters a state in which the cover 10 is pressed by about 9 mm when compared to the cover 10 illustrated in FIG. 1A, and then, the amount of interference between the cover 10 and the housing 30 may increase. Accordingly, an increase in the amount of interference needs to be avoided.

Therefore, a motor is required of which an efficiency is improved through a decrease in weight by removing a coupling member through a reaction force design between a housing and a cover. In addition, a motor is required which allows a coupling defect to be prevented from being generated due to a reaction force when a system and the motor are coupled in an assembly process.

Technical Problem

An embodiment of the present invention is directed to providing a motor designed to prevent separation from a system due to a reaction force between a housing and a cover.

Objectives to be solved through an embodiment of the present invention are not limited to the above-described objective, and other objectives which are not mentioned above will be clearly understood by those skilled in the art through the following specification.

Technical Solution

One aspect of an embodiment of the present invention provides a motor including a housing, a stator disposed in the housing, a rotor disposed in the stator, a shaft coupled to the rotor, a cover disposed on the housing, and an upper bearing disposed on the cover, wherein the cover includes a first body on which the upper bearing is disposed, a second body disposed under the first body, a third body disposed under the second body, and a protrusion protruding from an outer circumferential surface of the second body in a radial direction, and the third body includes an inclined surface that is inclined inward with respect to the outer circumferential surface of the second body.

In this case, the first body may include a first groove concavely formed in a shaft direction, the upper bearing may be disposed in the first groove, and an inner surface of the first body forming the first groove and an outer circumferential surface of the upper bearing may form a first angle ($\theta 1$).

In addition, the first angle ($\theta 1$) may be in the range of 2.5° to 3.5°.

An outer circumferential surface of the first body may be disposed further inward than the outer circumferential surface of the second body, and a sealing member may be disposed between the outer circumferential surface of the first body and an inner circumferential surface of the housing in the radial direction.

A width of the protrusion in the shaft direction may be less than a width of the second body in the shaft direction. For example, the second body may include a first region extending from an edge of a lower side of the first body in the radial direction, and a second region extending from a lower surface of the first region in a shaft direction. In this case the protrusion may be disposed on an outer circumferential surface of the second region, and a width of the protrusion in the shaft direction is less than a width of the second region of the second body in the shaft direction.

The protrusion may include a first surface in contact with an inner circumferential surface of the housing and a second surface inclined inward from a lower side of the first surface.

A curved surface disposed on a central portion of the first surface may be in contact with the inner circumferential surface of the housing, and a curvature of the curved surface may be the same as a curvature of the inner circumferential surface of the housing.

The second surface and the outer circumferential surface of the second body may form a second angle ($\theta 2$), and a lower end of the second surface may be disposed between the second body and the third body.

Meanwhile, the inclined surface and the outer circumferential surface of the second body may form a third angle ($\theta 3$), and the third angle ($\theta 3$) may be in the range of 4° to 5.5°.

When the upper bearing is pressed, the third angle ($\theta 3$) may be decreased. For example, the third angle ($\theta 3$) may be decreased by 1° and be in the range of 3° to 4.5°.

The housing may include a housing body and a plurality of protrusions protruding inward from an inner circumferential surface of the housing body, and the protrusions may be disposed in second grooves concavely formed in the outer circumferential surface of the third body in the radial direction.

In this case, the protrusions may be formed through an embo process.

Advantageous Effects

According to embodiments, a motor can allow the decoupling of a system and a motor due to a reaction force to be prevented when the system and the motor are coupled through a reaction force design between a cover and each of a housing and a bearing. That is, the motor can be provided in which the reaction force design is performed to prevent an increase in the amount of interference between the housing and the cover and an increase in the amount of interference between the bearing and the cover when the system and the motor are coupled.

The motor can avoid the increase in the amount of interference between the housing and the cover due to the reaction force using protrusions of the cover. In this case, at least three protrusions of the cover may be disposed along an outer circumferential surface so that a state in which the cover is concentric with the housing can be maintained.

In addition, even when an upper bearing is pressed due to the coupling of the system and the motor, the increase in the amount of interference due to the reaction force between the housing and the cover can be avoided due to an inclined surface of the cover.

In addition, an inner surface of the cover forming a groove in which the upper bearing is seated can be formed to have a predetermined inclination with respect to an outer circumferential surface of the upper bearing. Accordingly, when the upper bearing is pressed due to the coupling of the system and the motor, an increase in the amount of interference due to a reaction force which may be generated between the upper bearing and an inner circumferential surface of the caver can be avoided.

Various useful advantages and effects of the present invention are not limited to the above-described contents and will be more easily understood in the description of specific embodiments of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, embodiments will be described in detail with reference to the accompanying drawings, and components that are the same or correspond to each other are denoted by the same reference numeral regardless of the figure number, and redundant description thereof will be omitted.

Figure 2:
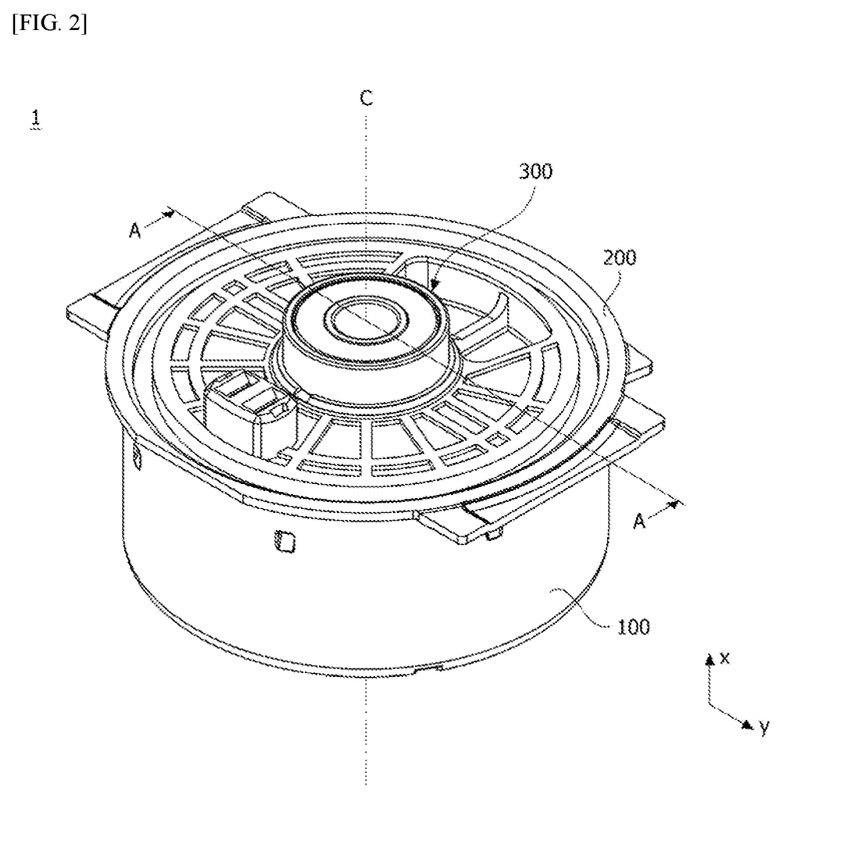
FIG. 2 is a perspective view illustrating a motor according to an embodiment.
Figure 3:
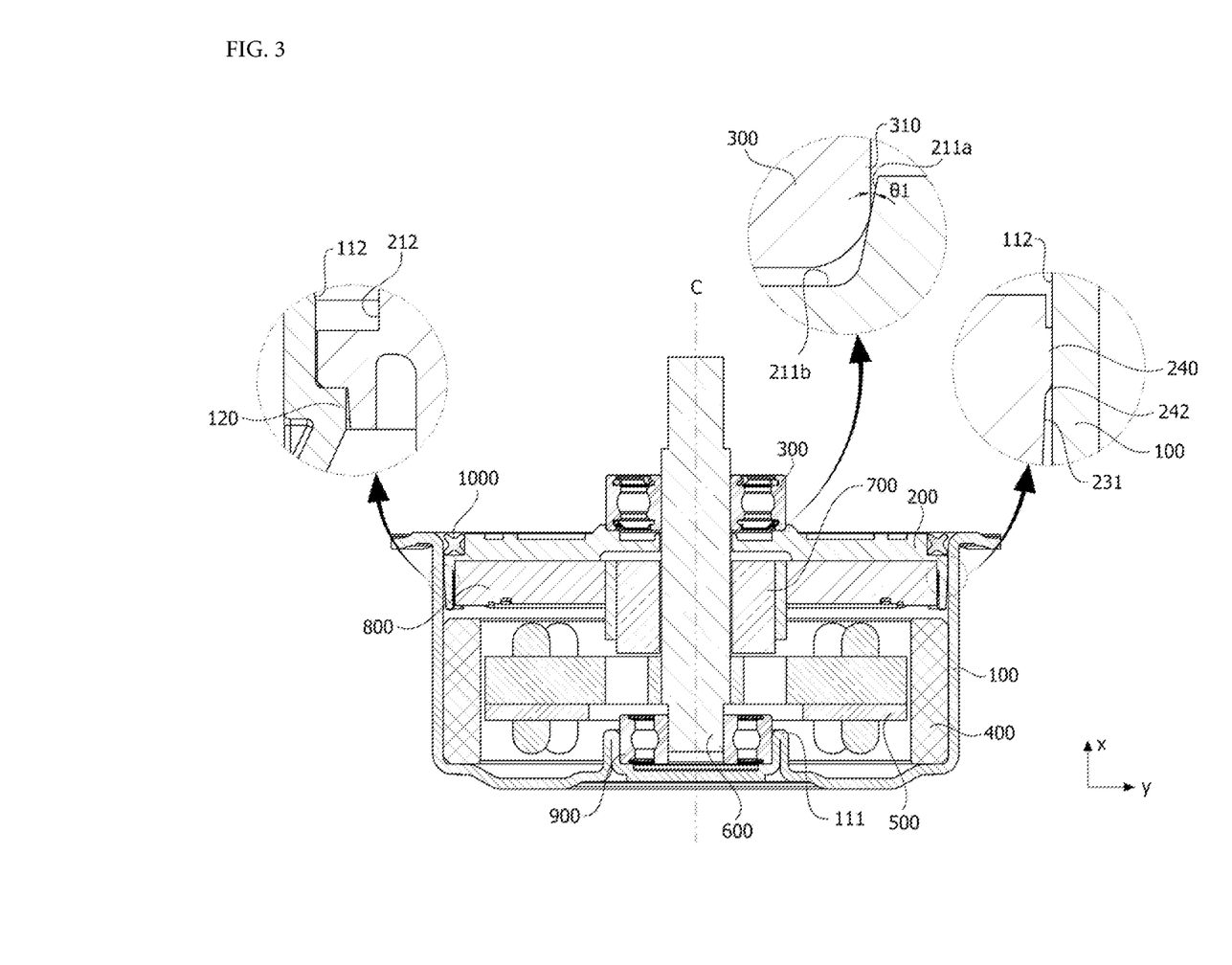
FIG. 3 is a cross-sectional view illustrating the motor according to the embodiment.

FIG. 2 is a perspective view illustrating a motor according to an embodiment, and FIG. 3 is a cross-sectional view illustrating the motor according to the embodiment. Here, FIG. 3 is a cross-sectional view taken along line A-A of FIG. 2. In addition, an x-direction of FIG. 3 denotes a shaft direction, and a y-direction denotes a radial direction. In addition, a reference numeral C denotes a center of the motor 1.

Referring to FIGS. 2 and 3, a motor 1 according to the embodiment may include a housing 100, a cover 200 disposed on the housing 100, an upper bearing 300 disposed above the cover 200, a stator 400 disposed in the housing 100, a rotor 500 disposed inside the stator 400, and a shaft 600 coupled to the rotor 500. In addition, the motor 1 may include a commutator 700 coupled to the shaft 600, a brush 800 of which one side comes into contact with the commutator 700, and a lower bearing 900. In this case, the term "inside" denotes a direction toward a center C of the motor 1 in the radial direction, and the term "outside" denotes a direction opposite to "inside."

The motor 1 may be a motor used in an electronic power steering (EPS) system. The EPS system may assist a steering force using a driving force of the motor to secure turning stability and quickly provide a restoring force of a vehicle. Accordingly, a driver of the vehicle can safely travel. Alternatively, the motor 1 may be a motor used in an anti-lock brake system (ABS). That is, the shaft 600 in the motor 1 may be connected to a brake system of a vehicle to transmit a force for controlling a braking force so as to solve an unstable steering problem generated when a brake pedal is pressed while the vehicle is running.

The housing 100, the cover 200, and the upper bearing 300 may form an exterior of the motor 1. In this case, the cover 200 may be disposed to cover an open upper portion of the housing 100.

An accommodation space may be formed by coupling of the housing 100 and the cover 200 therein. In addition, as illustrated in FIG. 3, the stator 400, the rotor 500, the shaft 600, the commutator 700, and the like may be disposed in the accommodation space.

The housing 100 may accommodate the stator 400, the rotor 500, and the like therein. In this case, a shape or material of the housing 100 may be variously changed. For example, the housing 100 may be formed of a metal material which withstands even high temperatures well.

Figure 4:
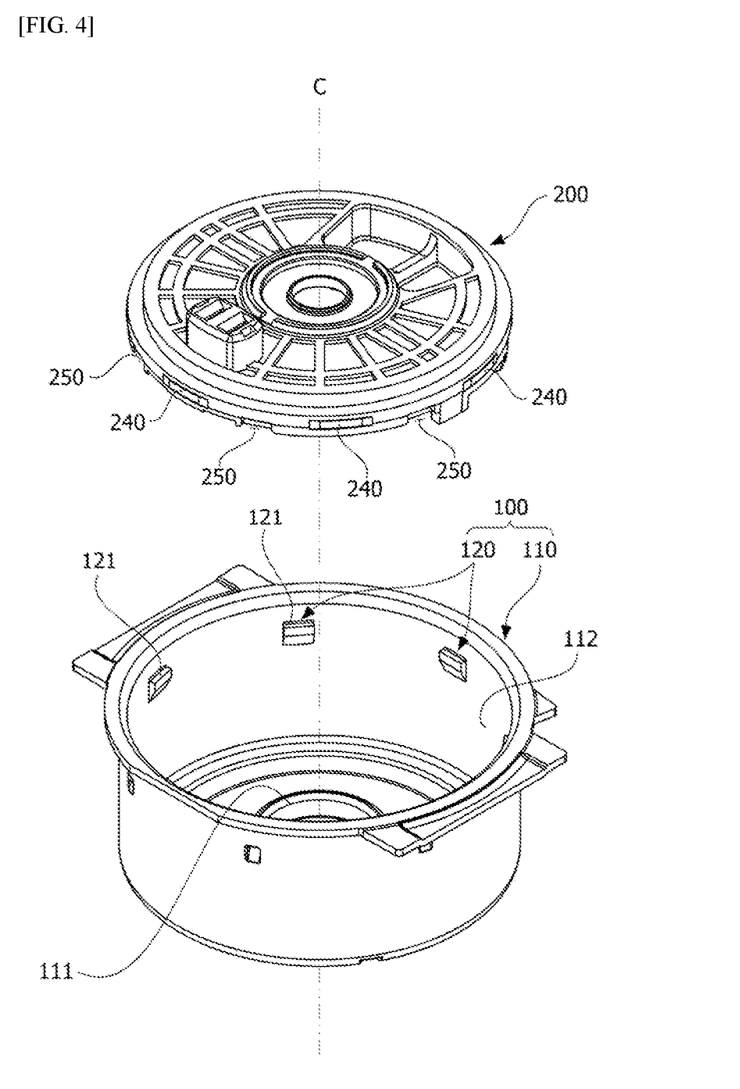
FIG. 4 is a view illustrating a housing and a cover of the motor according to the embodiment.

Referring to FIGS. 3 and 4, the housing 100 may include a housing body 110 and a plurality of protrusions 120 disposed inside the housing body 110. In this case, the housing body 110 and the protrusions 120 may be integrally formed.

The housing body 110 may be formed in a cylindrical shape. In addition, the stator 400, the rotor 500, and the like may be disposed in the housing body 110.

In addition, the lower bearing 900 may be disposed on a bottom surface of the housing body 110. In this case, the housing body 110 may include a housing protrusion 111 protruding from the bottom surface in the shaft direction to arrange the lower bearing 900. Accordingly, an outer circumferential surface of the lower bearing 900 disposed on an outer circumferential surface of a lower side of the shaft 600 may be supported by the housing protrusion 111.

When the housing 100 and the cover 200 are coupled, the protrusions 120 may support the cover 200. Accordingly, a preset height of the cover 200 in the shaft direction is maintained due to the protrusions 120 so that the cover 200 may be disposed on the housing 100.

The protrusion 120 may be formed to protrude from an inner circumferential surface 112 of the housing body 110 in the radial direction. In addition, the protrusion 120 may include an upper surface 121.

In addition, at least three protrusions 120 may be disposed on the housing body 110 in a circumferential direction at the same intervals. That is, since the protrusions 120 of the housing 100 are coupled to the cover 200 at at least three points and support a lower portion side of the cover 200, shaking of the cover 200 in the shaft direction is prevented or minimized.

In addition, since at least three protrusions 120 are disposed on the housing body 110 in the circumferential direction at the same intervals, a concentric state of the housing 100 and the cover 200 may be maintained.

Meanwhile, the protrusion 120 may protrude due to an embo process. That is, a force may be applied to an outer side of the housing body 110 so that the protrusion 120 may protrude inward from the housing body 110.

The cover 200 may be disposed on an open surface of the housing 100, that is, the upper portion of the housing 100, to cover the housing 100. In this case, the cover 200 may be coupled to the upper portion of the housing 100 in a press-fitting manner. In this case, the cover 200 may be formed of a synthetic resin material such as plastic.

In addition, a lower portion of the cover 200 may be supported by the protrusion 120 of the housing 100. In addition, a hole may be formed in a central portion of the cover 200 to arrange the shaft 600. In this case, the shaft 600 may be disposed in the hole.

Figure 5:
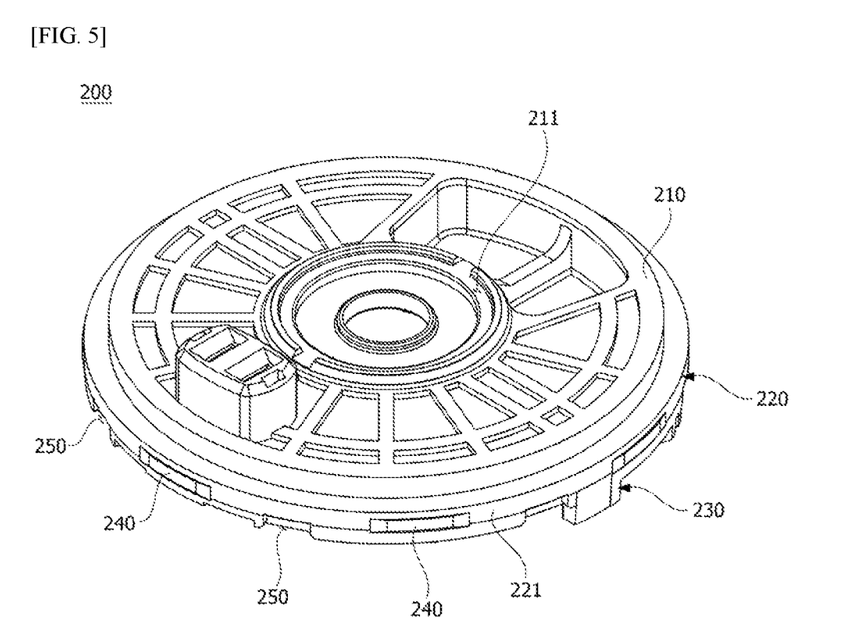
FIG. 5 is a perspective view illustrating the cover of the motor according to the embodiment.
Figure 6:
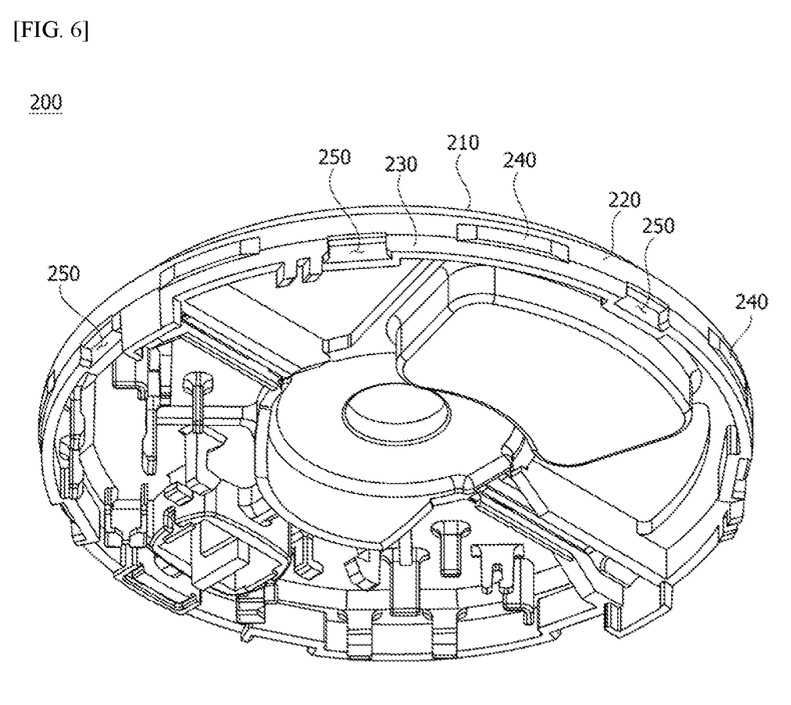
FIG. 6 is a bottom perspective view illustrating the cover of the motor according to the embodiment.
Figure 7:
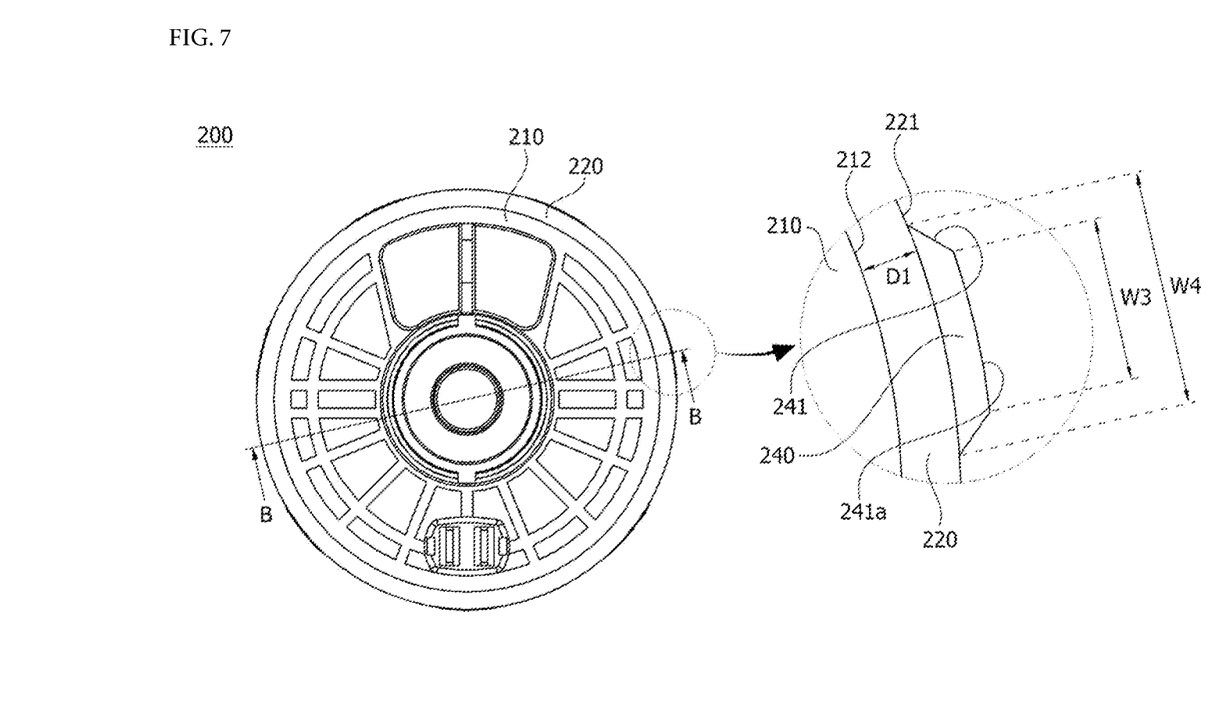
FIG. 7 is a plan view illustrating the cover of the motor according to the embodiment.
Figure 8:
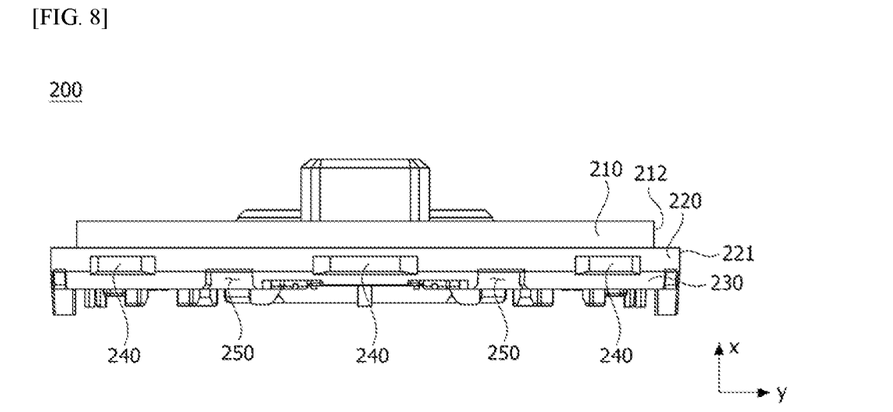
FIG. 8 is a front view illustrating the cover of the motor according to the embodiment.
Figure 9:
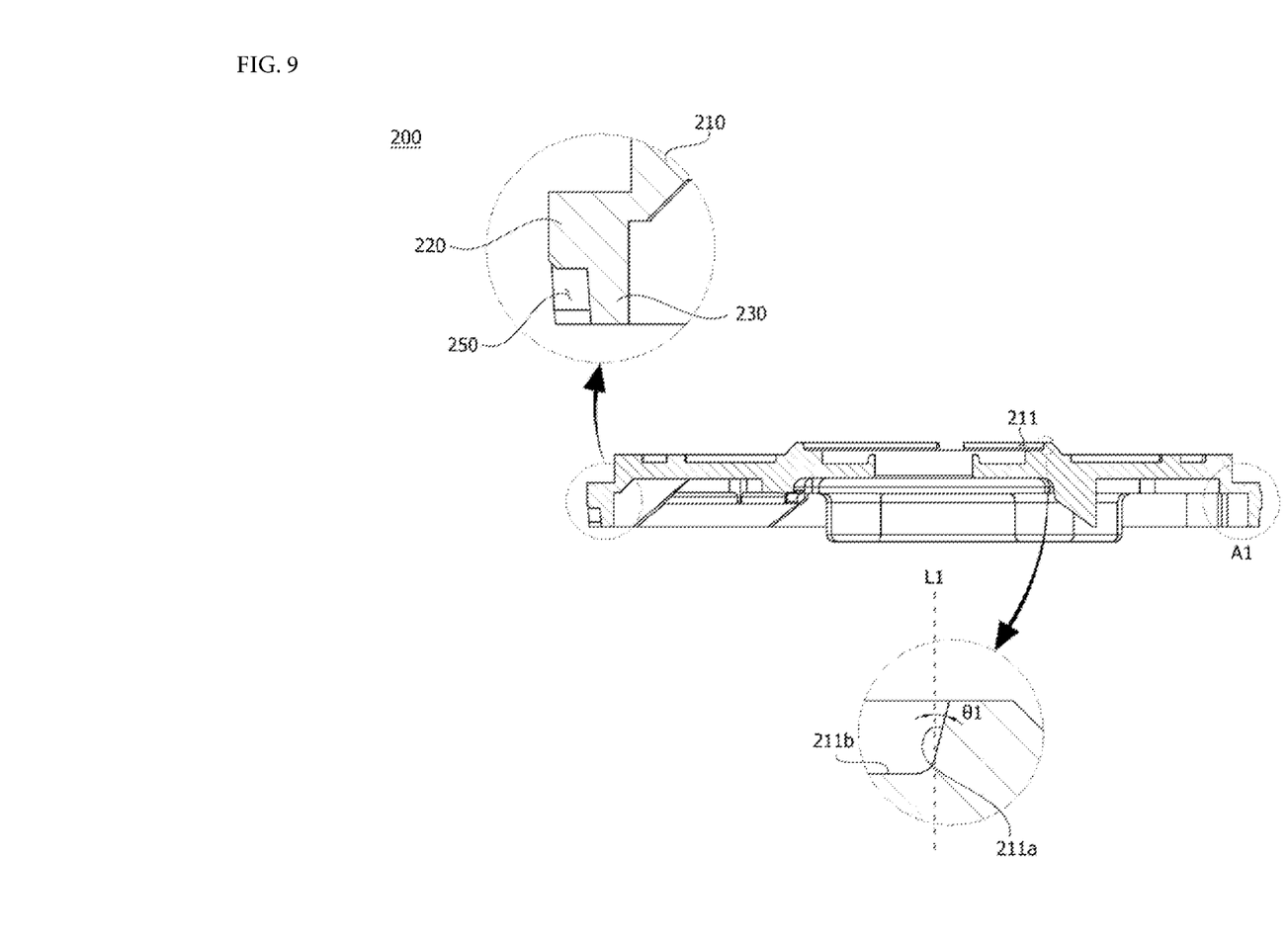
FIG. 9 is a cross-sectional view illustrating the cover of the motor according to the embodiment.
Figure 10:
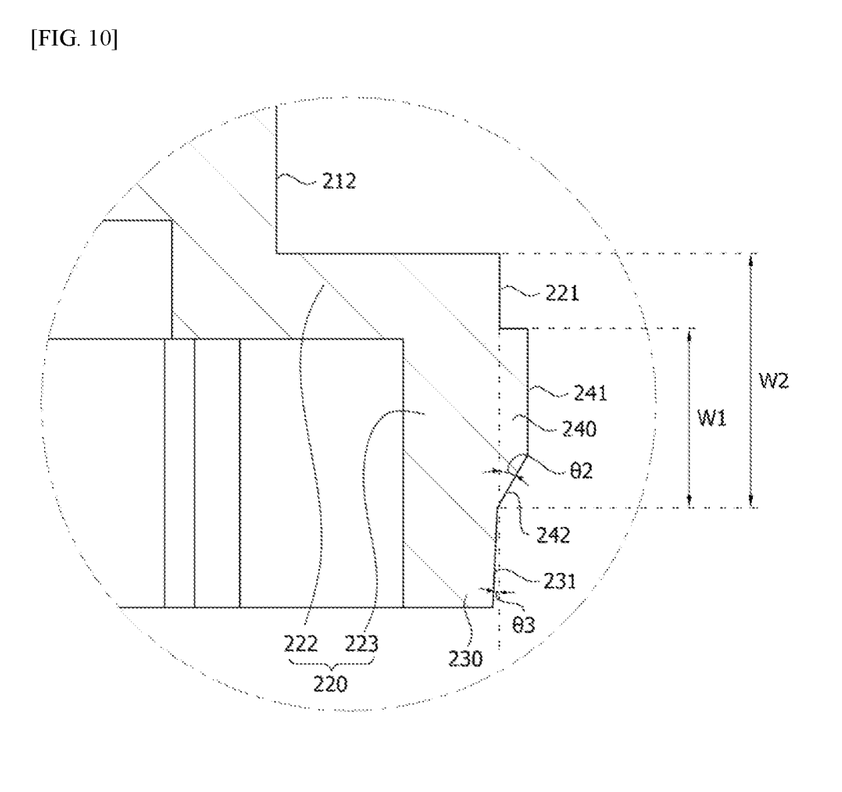
FIG. 10 is an enlarged view illustrating region A1 of FIG. 9.

FIG. 5 is a perspective view illustrating the cover of the motor according to the embodiment, FIG. 6 is a bottom perspective view illustrating the cover of the motor according to the embodiment, FIG. 7 is a plan view illustrating the cover of the motor according to the embodiment, FIG. 8 is a front view illustrating the cover of the motor according to the embodiment, FIG. 9 is a cross-sectional view illustrating the cover of the motor according to the embodiment, and FIG. 10 is an enlarged view illustrating region A1 of FIG. 9. FIG. 9 is a cross-sectional view taken along line B-B of FIG. 7.

Referring to FIGS. 5 to 9, the cover 200 may include a first body 210 in which the upper bearing 300 is disposed, a second body 220 disposed under the first body 210, a third body 230 disposed under the second body 220, and a protrusion 240 protruding from an outer circumferential surface 221 of the second body 220 in the radial direction. In addition, the cover 200 may further include a second groove 250. In this case, the first body 210, the second body 220, the third body 230, and the protrusion 240 may be integrally formed.

The upper bearing 300 is disposed at a central portion of an upper portion of the first body 210. For example, a first groove 211 may be concavely formed at a central portion of the first body 210 in the shaft direction. In addition, the upper bearing 300 is disposed on the first groove 211. In this case, the upper bearing 300 may be coupled to the first groove 211 in a press-fitting manner.

The first groove 211 may be disposed adjacent to an outer side of the hole.

Referring to FIG. 3, an inner surface 211a of the first body 210 forming the first groove 211 may have a first angle θ1 with respect to an outer circumferential surface 310 of the upper bearing 300.

Referring to FIG. 9, the inner surface 211a of the first body 210 may have the first angle θ1 with respect to a virtual line L1 disposed parallel to the center C of the shaft 600. For example, the inner surface 211a of the first body 210 may be provided as an inclined surface. In this case, the inner surface 211a of the first body 210 may be referred to as a first inclined surface.

When the upper bearing 300 is disposed in the first groove 211, a lower side of the upper bearing 300 is in contact with the inner surface 211a, but an upper side thereof does not come into contact with the inner surface 211a. That is, an upper portion side of the outer circumferential surface 310 of the upper bearing 300 is disposed to be spaced apart from the inner surface 211a.

In this case, the first angle θ1 may be in the range of 2.5° to 3.5°. However, when the system 40 presses the upper bearing 300, the first angle θ1 may be decreased by about 1° with respect to the outer circumferential surface 310 of the upper bearing 300.

Accordingly, since the inner surface 211a of the first body 210 is formed to have a predetermined inclination with respect to the outer circumferential surface 310 of the upper bearing 300, even when the upper bearing 300 is pressed by the system 40 in the shaft direction, an increase in the amount of interference due to a reaction force between the upper bearing 300 and the inner surface 211a of the cover 200 may be avoided.

Meanwhile, the upper bearing 300 may be disposed to be spaced apart from a bottom surface 211b of the first groove 211. In addition, an elastic member (not shown) such as a washer may be disposed between the bottom surface 211b of the first groove 211 and the upper bearing 300. Accordingly, even when the upper bearing 300 is pressed by the system 40 in the shaft direction, the elastic member may elastically support the upper bearing 300.

In addition, as illustrated in FIGS. 3 and 9, rounding may be performed on a corner at which the inner surface 211a meets the bottom surface 211b.

Referring to FIG. 6, the brush 800 and the like may be disposed under the first body 210.

In addition, an outer circumferential surface 212 of the first body 210 may be disposed further inward than the outer circumferential surface 221 of the second body 220. As illustrated in FIG. 7, the outer circumferential surface 212 of the first body 210 may be disposed to be spaced apart from the outer circumferential surface 221 of the second body 220 by a predetermined distance D1 in the radial direction. That is, a radius of the outer circumferential surface 212 of the first body 210 is less than a radius of the outer circumferential surface 221 of the second body 220.

Accordingly, a sealing member 1000 may be disposed between the outer circumferential surface 212 of the first body 210 and the inner circumferential surface 112 of the housing 100. In this case, the sealing member 1000 may be disposed above the second body 220. Accordingly, the motor 1 may include the sealing member 1000 disposed between the inner circumferential surface 112 of the housing 100 and the outer circumferential surface 212 of the first body 210 of the cover 200.

In this case, the sealing member 1000 may be formed of a rubber material, and a cross section thereof may be formed to have an 'X' or 'D' shape. In the case in which the cross section has the 'X' shape, end points forming the 'X' shape are in contact with the outer circumferential surface 212 of the first body 210 and the inner circumferential surface 112 of the housing 100. In addition, in the case in which the sealing member 1000 is formed in the 'D' shape, when one portion including a curvature is disposed to be in contact with the outer circumferential surface 212 of the first body 210, and the other portion is disposed to be in contact with the inner circumferential surface 112 of the housing 100, an effect in which a foreign material is prevented from being introduced may be further achieved. However, the present invention is not limited thereto. For example, an O-ring may also be disposed as the sealing member 1000.

Accordingly, the sealing member 1000 may prevent liquid such as water from being introduced into the motor 1.

The second body 220 may be disposed under the first body 210. In this case, the second body 220 may be formed in a disc shape in which a hole is formed in a central portion thereof but is not necessarily limited thereto.

Referring to FIG. 10, the second body 220 may include a first region 222 extending from an edge of a lower side of the first body 210 in the radial direction and a second region 223 extending in the shaft direction. For example, the second body 220 may be formed to have a cross section in a "1" shape.

Accordingly, the outer circumferential surface 221 of the second body 220 may be an outer circumferential surface of the second region 223. In addition, the sealing member 1000 may be disposed on the first region 222.

The third body 230 may be disposed under the second body 220.

Referring to FIG. 9, the third body 230 may extend from an end portion of a lower portion side of the second body 220 in the shaft direction. Specifically, the third body 230 may extend downward from the second region 223 of the second body 220.

As illustrated in FIGS. 9 and 10, the third body 230 may include an inclined surface 231 inclined inward with respect to the outer circumferential surface 221 of the second body 220. As illustrated in FIG. 3, the inclined surface 231 may be disposed to be spaced apart from the inner circumferential surface 112 of the housing 100. In this case, the inclined surface 231 may be referred to as a second inclined surface.

The inclined surface 231 may have a third angle θ3 with respect to the outer circumferential surface 221 of the second body 220. In this case, the third angle θ3 may be in the range of 4° to 5.5°. However, when the system 40 presses the upper bearing 300, the third angle θ3 may be decreased by about 1° with respect to the inner circumferential surface 112 of the housing 100. Accordingly, the third angle θ3 may be formed to have 3° to 4.5°.

Accordingly, since the inclined surface 231 is formed to have a predetermined inclination with respect to the outer circumferential surface 221 of the second body 220, even when the upper bearing 300 is pressed by the system 40 in the shaft direction, the inclined surface 231 does not come into contact with the inner circumferential surface 112 of the housing 100. Accordingly, due to the inclined surface 231, an increase in the amount of interference due to a reaction force between the housing 100 and the inner surface 211*a* of the cover 200 may be avoided.

In addition, since the inclined surface 231 extends from a lower side of a second surface 242 to form the third angle θ3, the increase in the amount of interference due to the reaction force between the housing 100 and the inner surface 211*a* of the cover 200 may be further avoided.

The protrusion 240 may protrude outward from the outer circumferential surface 221 of the second body 220. In addition, the protrusion 240 may be in contact with the inner circumferential surface 112 of the housing 100.

Referring to FIG. 10, a width W1 of the protrusion 240 in the shaft direction is less than a width W2 of the second body 220 in the shaft direction. In this case, the width W1 of the protrusion 240 in the shaft direction may be 0.7 to 0.8 times the width W2 of the second body 220 in the shaft direction.

The protrusion 240 may include a first surface 241 in contact with the inner circumferential surface 112 of the housing 100 and the second surface 242 inclined inward from a lower side of the first surface 241.

The first surface 241 may be disposed on the second surface 242. In addition, the first surface 241 may be disposed to be spaced outward from the outer circumferential surface 221 of the second body 220. Accordingly, when the housing 100 and the cover 200 are coupled, the first surface 241 may be in contact with the inner circumferential surface 112 of the housing 100.

Referring to FIG. 7, the first surface 241 may include a curved surface 241*a* formed to be disposed in a central portion thereof. In this case, a curvature of the curved surface 241*a* may be the same as a curvature of the inner circumferential surface 112 of the housing 100. Accordingly, when the housing 100 and the cover 200 are coupled, the curved surface 241*a* may be in contact with the inner circumferential surface 112 of the housing 100. A contact amount between the inner circumferential surface 112 of the housing 100 and the cover 200 may be decreased due to the curved surface 241*a*.

As illustrated in FIG. 7, a width W3 of the curved surface 241*a* may be 0.67 to 1.00 times a width W4 of the protrusion 240 in the circumferential direction. In this case, the width W4 of the protrusion 240 may be a width of the first surface 241 in the circumferential direction.

The second surface 242 may have a second angle θ2 with respect to the outer circumferential surface 221 of the second body 220. In this case, the second angle θ2 may be in the range of 7° to 32°. In addition, the second surface 242 may be referred to as a fourth inclined surface.

However, when the system 40 presses the upper bearing 300, the second angle θ2 may be decreased by about 1° with respect to the inner circumferential surface 112 of the housing 100.

Accordingly, since the second surface 242 is formed to have a predetermined inclination with respect to the outer circumferential surface 221 of the second body 220 and disposed further inward than the first surface 241, even when the upper bearing 300 is pressed by the system 40 in the shaft direction, the second surface 242 does not come into contact with the inner circumferential surface 112 of the housing 100. Accordingly, the increase in the amount of interference due to the reaction force between the housing 100 and the inner surface 211*a* of the cover 200 may be avoided due to the second surface 242.

The second groove 250 may be formed in a lower side of the cover 200.

The second groove 250 may be concavely formed in an outer circumferential surface of the third body 230 in the radial direction. Accordingly, the protrusion 120 of the housing 100 may be disposed in the second groove 250.

In this case, the second groove 250 may include an inclined surface formed in order to prevent interference with the protrusion 120. In this case, the inclined surface forming the second groove 250 may be referred to as a third inclined surface. As illustrated in FIG. 3, the third inclined surface and an inner surface of the protrusion 120 may form a fourth angle. Accordingly, due to the third inclined surface, the inner surface of the protrusion 120 is disposed to be spaced apart from the third inclined surface.

Due to the coupling of the protrusion 120 and the second groove 250, the movement of the cover 200 may be prevented in the circumferential direction.

When the protrusion 120 and the second groove 250 are coupled, the upper surface 121 of the protrusion 120 may be in contact with a lower surface of the second body 220.

Since the cover 200 is supported by the protrusion 120, the cover 200 may be disposed at a preset position with respect to the housing 100 in the shaft direction.

However, since an edge of the lower portion side of the cover 200 is supported by the protrusion 120, when the system 40 presses the upper bearing 300, a bending phenomenon may occur in which a central portion of the cover 200 is bent inward in the shaft direction.

However, in the motor 1, the increase in the amount of interference due to the reaction force may be avoided due to the inner surface 211*a*, which is formed to have the first angle θ1, of the cover 200, the second surface 242, which is formed to have the second angle θ2, of the cover 200, and the inclined surface 231 formed to have the third angle θ3 even when the upper bearing 300 is pressed.

Figure 11:
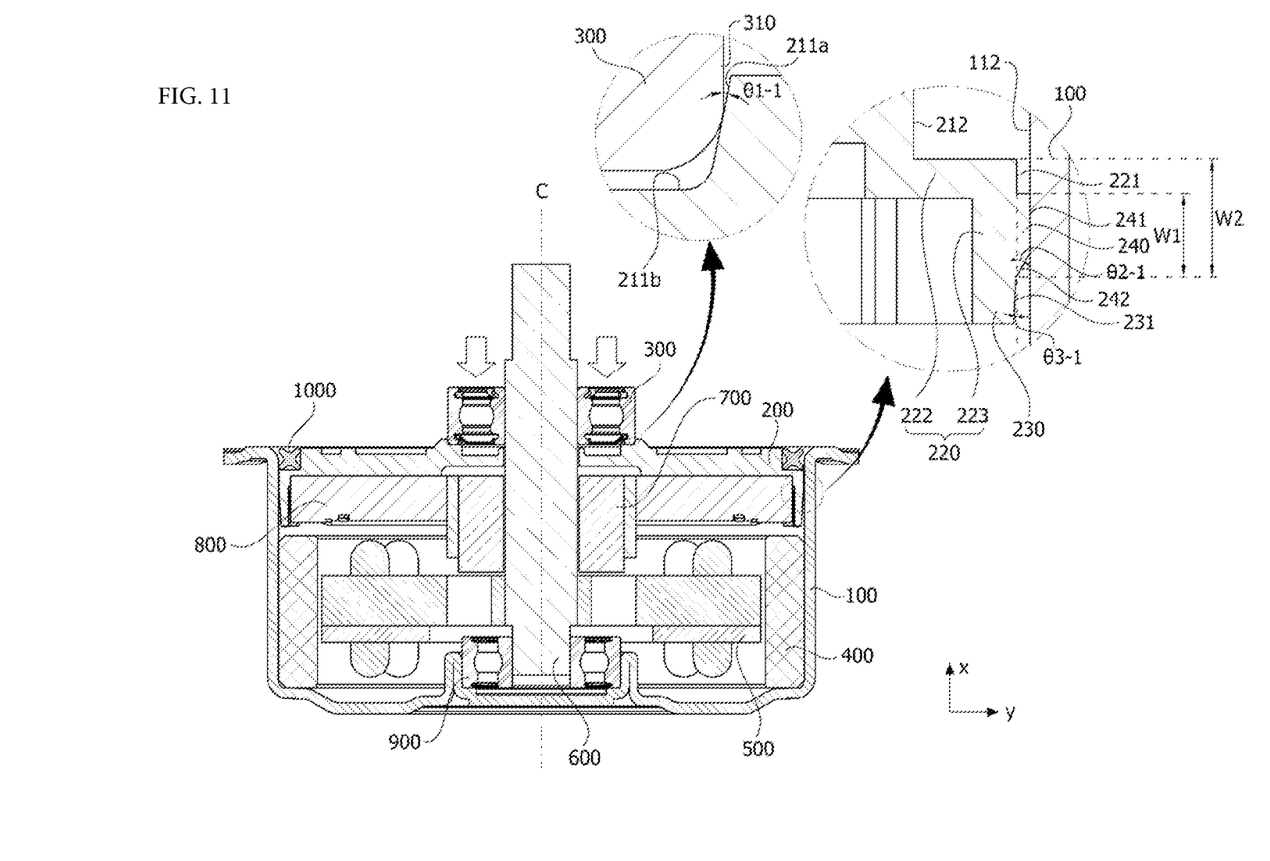
FIG. 11 is a view illustrating a state in which a bearing of the motor according to the embodiment is pressed.

FIG. 11 is a view illustrating a state in which the bearing of the motor according to the embodiment is pressed.

Referring to FIG. 11, when the system 40 presses the upper bearing 300, the first angle θ1 may become a first-1 angle θ1-1 which is decreased from the first angle θ1 by about 1° with respect to the outer circumferential surface 310 of the upper bearing 300. However, since the upper side of the upper bearing 300 does not come into contact with the inner surface 211*a*, the increase in the amount of interference due to the reaction force may be avoided.

In addition, the second angle θ2 may become a second-1 angle θ2-1 which is decreased from the second angle θ2 by about 1° with respect to the inner circumferential surface 112 of the housing 100. However, since the second surface 242 does not come into contact with the inner circumferential surface 112 of the housing 100, the increase in the amount of interference due to the reaction force may be avoided.

In addition, the third angle θ3 may become a third-1 angle θ3-1 which is decreased from the second angle θ2 by about 1° with respect to the inner circumferential surface 112 of the housing 100. However, since the inclined surface 231 does not come into contact with the inner circumferential surface 112 of the housing 100, the increase in the amount of interference due to the reaction force may be avoided.

As illustrated in FIG. 3, the upper bearing 300 may be disposed on an outer circumferential surface of an upper portion side of the shaft 600. In this case, the upper bearing 300 may be supported by the cover 200.

The stator 400 electrically interacts with the rotor 500 to induce rotation of the rotor 500. The stator 400 is coupled to an inside of the housing 100. In addition, the stator 400 may include a plurality of magnets. The magnets generate a rotating magnetic field with a coil wound around the rotor

500. In each of the magnets, an N-pole and an S-pole may be alternately disposed around the center C in the circumferential direction.

Meanwhile, the stator 400 may include a stator core in order to arrange the magnet but is not necessarily limited thereto. The stator core may be manufactured by coupling a plurality of divided cores or manufactured in a single core form formed as one barrel.

The rotor 500 is disposed inside the stator 400. That is, the stator 400 may be disposed outside the rotor 500.

The rotor 500 may include a rotor core and the coil. The rotor core may be formed in a form in which a plurality of thin steel plates are stacked but is not necessarily limited thereto. For example, the rotor core may also be formed as one single product.

A plurality of teeth may be formed to protrude from an outer circumferential surface of the rotor core. The tooth may be disposed to protrude in the radial direction from a center of the rotor 500. In this case, the tooth may be disposed to face the magnet. In addition, the coil is wound around each of the teeth. In this case, an insulator may be installed on the tooth. The insulator insulates the stator core from the coil.

When a current is supplied to the coil, an electrical interaction is induced between the coil and the magnet so that the rotor 500 may be rotated. In the case in which the rotor 500 is rotated, the shaft 600 is also rotated with the rotor 5000. In this case, the shaft 600 may be supported by the upper bearing 300 and the lower bearing 900.

The commutator 700 is coupled to the shaft 600. In addition, the commutator 700 may be disposed above the rotor 500. In addition, the commutator 700 is electrically connected to the coil of the rotor 500.

The brush 800 may be disposed under the cover 200. To this end, the motor 1 may include a brush holder. In this case, the brush 800 may be disposed in the brush holder.

In addition, an elastic member (not shown) such as a spring is disposed in the brush holder to press one side of the brush 800. Accordingly, the other side of the brush 800 is in contact with the commutator 700.

In addition, the motor 1 includes a terminal, a connector, a choke coil, a capacitor, and the like to allow power supplied from an external power device to be supplied to the brush 800.

While the invention has been shown and described with reference to the exemplary embodiments thereof, it will be understood by those skilled in the art that various changes in form and details may be made therein without departing from the spirit and scope of the invention as defined by the appended claims.

REFERENCE NUMERALS

| | |
|---|---|
| 1: MOTOR | 100: HOUSING |
| 120: PROTRUSION | 200: COVER |
| 210: FIRST BODY | 220: SECOND BODY |
| 230: THIRD BODY | 240: PROTRUSION |
| 250: SECOND GROOVE | 300: UPPER BEARING |
| 400: STATOR | 500: ROTOR |
| 600: SHAFT | 700: COMMUTATOR |
| 800: BRUSH | 900: LOWER BEARING |
| 1000: SEALING MEMBER | |

The invention claimed is:

1. A motor comprising:
a housing;
a cover disposed on the housing; and
an upper bearing disposed on the cover,
wherein the cover includes a first body on which the upper bearing is disposed,
a second body disposed under the first body,
a third body disposed under the second body, and
a protrusion protruding from an outer circumferential surface of the second body in a radial direction,
an outer circumferential surface of the protrusion is in contact with the inner circumferential surface of the housing, and
an outer circumferential surface of the third body is inclined inward with respect to the outer circumferential surface of the second body.

2. The motor of claim 1, wherein:
the first body includes a first groove concavely formed in a shaft direction;
the upper bearing is disposed in the first groove;
an inner surface of the first body forming the first groove and an outer circumferential surface of the upper bearing form a first angle ($\theta 1$); and
the first angle ($\theta 1$) is in a range of 2.5° to 3.5°.

3. The motor of claim 1, wherein:
an outer circumferential surface of the first body is disposed further inward than the outer circumferential surface of the second body; and
a sealing member is disposed between the outer circumferential surface of the first body and an inner circumferential surface of the housing.

4. The motor of claim 1, wherein:
the second body includes a first region extending from an edge of a lower side of the first body in the radial direction and a second region extending from a lower surface of the first region in a shaft direction;
the protrusion is disposed on an outer circumferential surface of the second region; and
a width of the protrusion in the shaft direction is less than a width of the second region of the second body in the shaft direction.

5. The motor of claim 1, wherein the protrusion includes a first surface in contact with an inner circumferential surface of the housing and a second surface which extends from a lower surface of the first surface and is inclined inward with respect to the first surface.

6. The motor of claim 5, wherein:
a curved surface disposed on a central portion of the first surface is in contact with the inner circumferential surface of the housing; and
a curvature of the curved surface is the same as a curvature of the inner circumferential surface of the housing.

7. The motor of claim 6, wherein:
the second surface and the outer circumferential surface of the second body form a second angle ($\theta 2$); and
a lower end of the second surface is disposed between the second body and the third body.

8. The motor of claim 1, wherein:
an inclined surface of the third body and the outer circumferential surface of the second body form a third angle ($\theta 3$); and
the third angle ($\theta 3$) is in a range of 4° to 5.5°.

9. The motor of claim 8, wherein, when the upper bearing is pressed, the third angle ($\theta 3$) is decreased by 1° and is in a range of 3° to 4.5°.

10. The motor of claim 1, wherein:
the housing includes a housing body and a plurality of protrusions protruding inward from an inner circumferential surface of the housing body; and
the protrusions are disposed in second grooves concavely formed in the outer circumferential surface of the third body in the radial direction.

* * * * *